(12) United States Patent
McMillan

(10) Patent No.: US 10,787,298 B1
(45) Date of Patent: Sep. 29, 2020

(54) BIODEGRADABLE BAG AND METHOD OF USING SAME FOR STORING AND TRANSPORTING ICE CHUNKS

(71) Applicant: Robert Scott McMillan, Montgomery, AL (US)

(72) Inventor: Robert Scott McMillan, Montgomery, AL (US)

(*) Notice: Subject to any disclaimer, the term of this patent is extended or adjusted under 35 U.S.C. 154(b) by 120 days.

(21) Appl. No.: 16/204,325

(22) Filed: Nov. 29, 2018

(51) Int. Cl.
| | | |
|---|---|---|
| *B65D 65/46* | (2006.01) | |
| *B65D 33/28* | (2006.01) | |
| *F25C 5/18* | (2018.01) | |
| *D04B 1/22* | (2006.01) | |

(52) U.S. Cl.
CPC ........... *B65D 65/466* (2013.01); *B65D 33/28* (2013.01); *D04B 1/22* (2013.01); *F25C 5/18* (2013.01); *D10B 2201/02* (2013.01); *D10B 2401/12* (2013.01)

(58) Field of Classification Search
CPC ........ F25C 5/18; F25C 5/20; F25D 2331/801; B65D 65/466; B65D 33/28; D10B 2201/02
USPC ..................................... 383/1, 117
See application file for complete search history.

(56) References Cited

U.S. PATENT DOCUMENTS

| | | | | |
|---|---|---|---|---|
| 1,441,282 A | * | 1/1923 | Hodgson ................... | A61F 7/10 383/110 |
| 1,576,488 A | * | 3/1926 | Hodgson ................... | A61F 7/10 383/110 |
| 1,597,845 A | * | 8/1926 | Vasquez .................... | B60P 1/40 414/520 |
| 1,904,729 A | * | 4/1933 | Hancock ................... | F25C 5/20 224/612 |
| 2,598,334 A | * | 5/1952 | Ahlburg ................. | B65D 63/14 383/74 |
| 3,347,297 A | * | 10/1967 | Garland ................. | B65D 65/46 383/1 |
| 4,132,049 A | * | 1/1979 | Mullins, Jr. ............... | B65B 1/36 53/384.1 |
| 4,404,817 A | * | 9/1983 | Cox, III .................... | F25C 5/18 62/320 |
| 5,277,016 A | * | 1/1994 | Williams ................ | B65B 5/067 53/459 |
| 2004/0084106 A1 | * | 5/2004 | James ....................... | F25C 5/20 141/313 |
| 2008/0119916 A1 | * | 5/2008 | Choucair .................. | A61F 7/10 607/104 |
| 2012/0014624 A1 | * | 1/2012 | Jones ................. | B65D 81/3893 383/110 |
| 2012/0165910 A1 | * | 6/2012 | Choucair .................. | A61F 7/10 607/112 |
| 2012/0275729 A1 | * | 11/2012 | Liang .................... | B29C 65/524 383/72 |

(Continued)

*Primary Examiner* — Cassey D Bauer
(74) *Attorney, Agent, or Firm* — C. Brandon Browning; Maynard, Cooper & Gale, PC

(57) ABSTRACT

A biodegradable bag and method of using same for storing and transporting ice chunks, the method including enclosing about 5 lbs to about 50 lbs of ice chunks within a 100% knitted, cotton yarn bag, placing the bag within a freezer for maintaining the ice chunks below at least 0° C., storing the bag containing the ice chunks in the freezer and transporting the bag containing the ice chunks in a freezer compartment of a motor vehicle to a retail location for purchase by an end-user.

20 Claims, 3 Drawing Sheets

(56) References Cited

U.S. PATENT DOCUMENTS

| | | | |
|---|---|---|---|
| 2014/0208778 A1* | 7/2014 | Raley | F25D 3/08 62/62 |
| 2018/0319569 A1* | 11/2018 | McGoff | B65D 81/3897 |
| 2020/0031563 A1* | 1/2020 | Dahnken | F25D 3/06 |

* cited by examiner

BIODEGRADABLE BAG AND METHOD OF USING SAME FOR STORING AND TRANSPORTING ICE CHUNKS

FIELD OF THE INVENTION

The present invention is directed to a biodegradable ice container, and more particularly, to use of an all-cotton, 100% biodegradable bag for storing and transporting ice chunks.

BACKGROUND OF THE INVENTION

The effects of plastic bags on the environment are devastating. This is especially true for plastic bags that find their way into waterways. Of particular concern are plastic bags used to store and transport ice. These bags are often used by fishermen to carry ice intended for cooling recently harvested fish and beachgoers to cool beverages and the like. Because of their proximity to waterways when used, these bags often are inadvertently blown by the wind into waterways, or in some instances, intentionally deposited in the waterways. Because plastic bags are not biodegradable, they accumulate in the waterways, as well as in landfills and on roadsides.

The effects of plastic bag accumulation in the oceans is often felt by sea creatures, especially sea mammals like whales, dolphins, and porpoises. Because these mammals eat sea nettles and jelly fish, they often mistake plastic bags for food. When the plastic bags are ingested, the animals are unable to continue with normal digestion and thus eventually die a slow and painful death from toxicity or intestinal blockage.

Plastic bags also cause toxic bio-magnification. This occurs when plastic bags break down into small particles and are ingested by small gill feeding and other aquatic species which, in turn, are eaten by larger fish causing increased concentrations of plastic in such larger species. This is problematic for the humans who eat the larger fish since plastics may include polychlorinated biphenyl (PCB), a carcinogen.

Accordingly, there is needed for an alternative to storing and/or transporting ice chunks in plastic bags.

SUMMARY OF THE INVENTION

The present invention is directed to a biodegradable bag for storing and/or transporting ice chunks. According to one aspect of the invention, there is provided a method for storing ice chunks including (i) forming a seamless, knitted fabric tube, wherein the fabric tube has an open first end and an open second end and is knitted using 100% cotton yarn, (ii) closing the first end of the tube using a 100% biodegradable thread thereby forming a 100% biodegradable bag having an open top and a closed bottom, (iii) placing ice chunks into the bag through the open top, (iv) tying an elongate 100% biodegradable closure material about the open top thereby enclosing the ice chunks within the bag, and (v) placing the bag containing the ice in a freezer.

In one embodiment, the method may include transporting the bag containing ice chunks in a freezer compartment of a motor vehicle. In another embodiment of the method, the bag containing the ice chunks may be removed from the freezer compartment and thereafter placed into a second freezer. In another embodiment, the second freezer is located at a retail store location. In yet another embodiment, a circular knitting machine is used to construct the fabric tube.

According to another aspect of the invention there is provided a method for storing and transporting ice chunks including (i) providing a bag having an open top and a closed bottom, wherein the bag is constructed of a 100% cotton, knitted fabric, (ii) placing ice chunks into the bag through the open top, (iii) tying an elongate 100% biodegradable closure material about the open top thereby enclosing the ice chunks within the bag, and (iv) placing the bag containing the ice in a freezer compartment of a motor vehicle situated at a first location. In one embodiment, the motor vehicle and the bag containing the ice is driven to a second location. In another embodiment, the bag containing the ice is removed from the freezer compartment and thereafter placed into a second freezer that is located at the second location.

According to yet another aspect of the invention there is provided a method for storing and transporting ice chunks including (i) providing a 100% cotton bag, (ii) placing ice chunks in the cotton bag, (iii) enclosing the ice chunks within the bag, and (iv) placing the bag containing the ice chunks in a freezer compartment of a motor vehicle situated at a first location.

In one embodiment of the method, the motor vehicle and the cotton bag containing the ice chunks is driven to a second location. In another embodiment of the method, the cotton bag containing the ice chunks is removed from the freezer compartment and thereafter placed into a second freezer that is located at the second location. In another embodiment, the cotton bag is knitted and, optionally, formed from a seamless fabric tube. In yet another embodiment the cotton bag includes about 5 lbs. of the ice chunks, about 8 lbs. of the ice chunks, about 10 lbs. of the ice chunks, about 20 lbs. of the ice chunks, or about 50 lbs. of the ice chunks. In yet another embodiment, the ice chunks are poured from the cotton bag into a cooler for cooling an item such as a beverage, food, a freshly harvested game animal and the like, the ice chunks being whole and in the substantially same condition and having the substantially same size and dimensions as when the ice chunks were enclosed within the cotton bag. After use, the cotton bag of the present invention is less likely to be inadvertently blown by wind into a waterway than a plastic bag because the weight of the cotton bag is greater than the weight of a conventional, plastic ice bag. Furthermore, the bag may be re-used, for example, to store and transport ice chunks produced by machines from which loose ice chunks can be purchased such as free-standing ice vending machines.

DETAILED DESCRIPTION OF THE INVENTION

The present invention is directed to a biodegradable bag and method of using same for storing and transporting chunks of ice. Generally, the method includes providing a 100% cotton bag 10, placing ice chunks 20 made of water in the cotton bag, enclosing and storing the ice chunks 20 within the bag 10, and thereafter, placing the bag 10 containing the ice chunks 20 in a freezer compartment of a motor vehicle situated at a first location and transporting the bag 10 containing the ice 20 to a second location for purchase by end-users.

Figure 1:
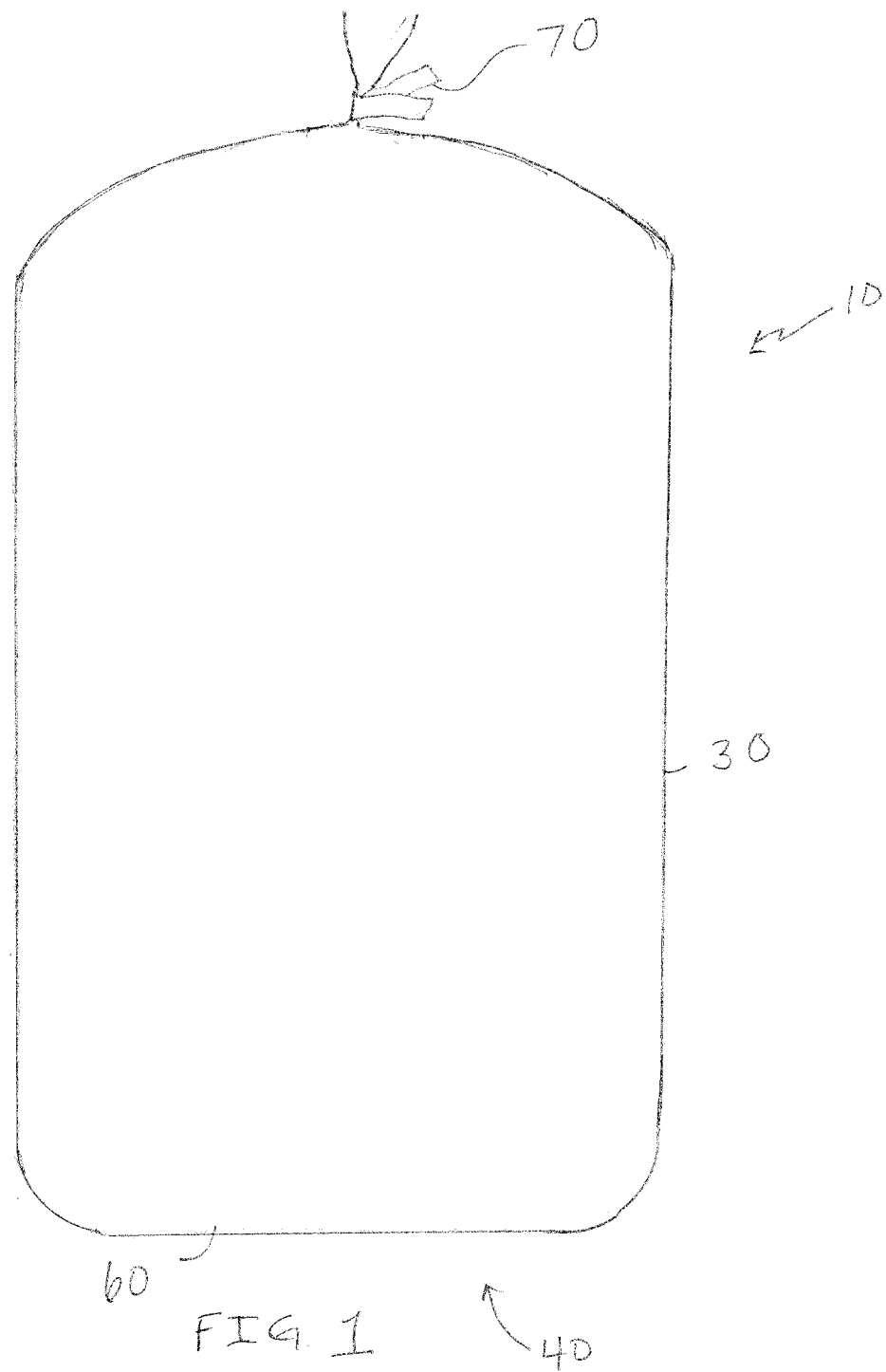
FIG. 1 is a perspective view of a bag in accordance with the present invention being used for storing and transporting ice chunks.
Figure 2:
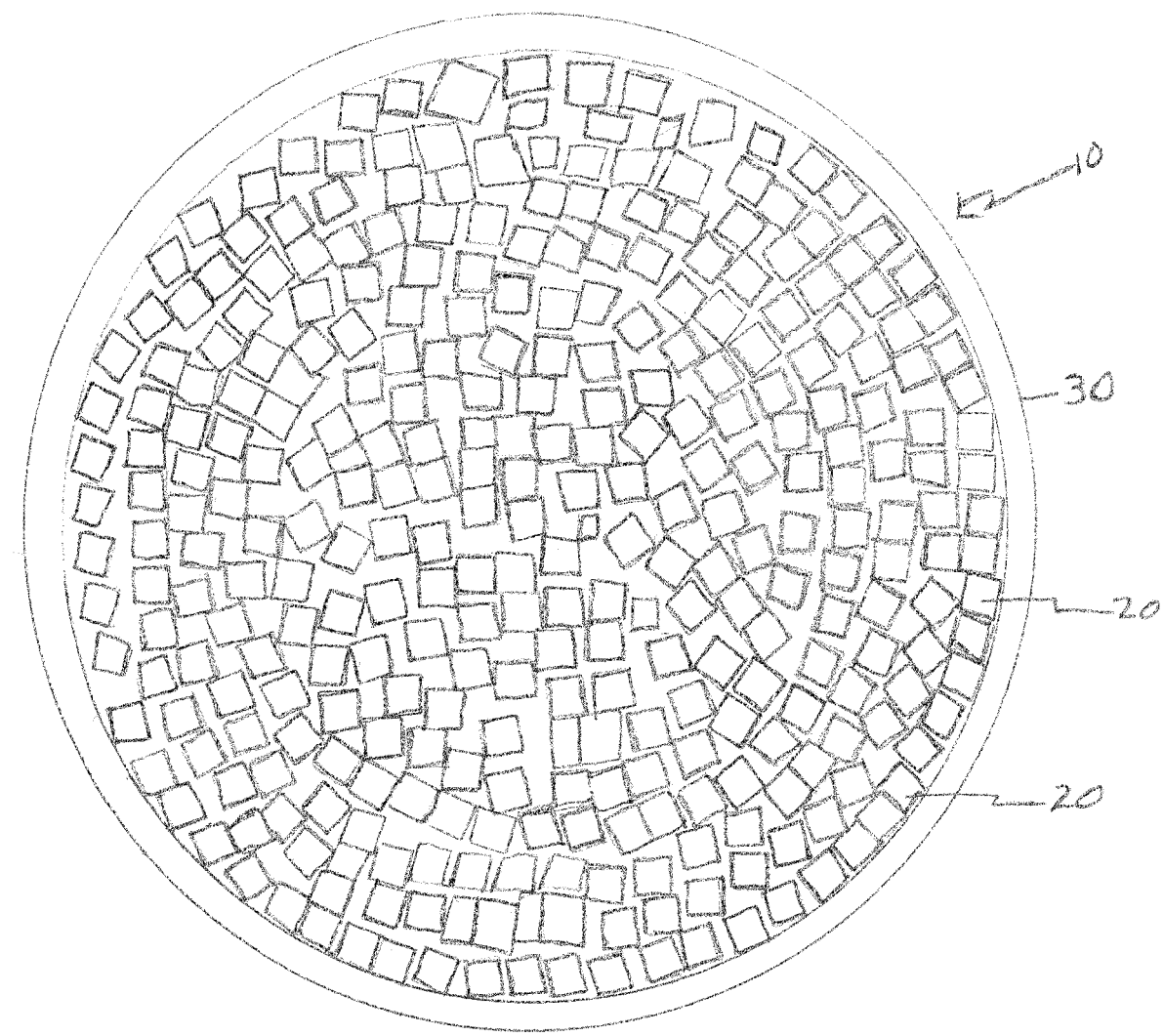
FIG. 2 is a sectional view of the bag of FIG. 1.
Figure 3:
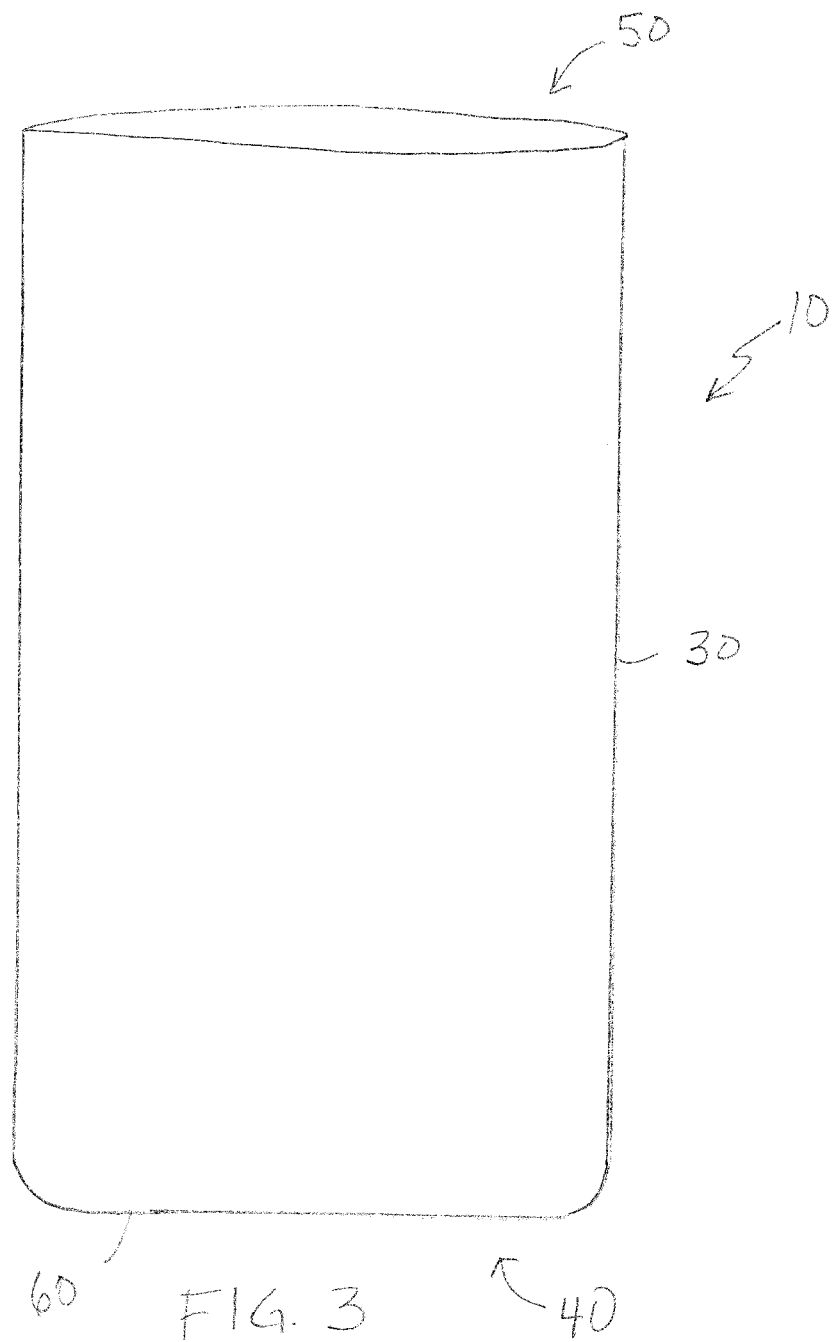
FIG. 3 is a perspective view of the bag of FIG. 1 prior to closing the open top with a tie.

Referring to FIGS. 1-3, bag 10 has a seamless, continuous sidewall 30, a closed bottom 40 and an open top 50. Bag 10 is constructed from 100% cotton yarn. The fabric may be plain, twill or satin woven or knitted when it is desired for the bag to stretch. The fabric may be a lightweight duck cloth or cotton duck, lawn fabric, eyelet fabric, calico fabric, cambric fabric, muslin fabric, or voile fabric. The bag may be single or double ply.

Bag 10 can be made by any means known in the art for making fabric bags having a closed bottom and an open top. For example, bag 10 can be manufactured using a circular knitting machine, which forms a fabric tube which is closed at one end using means like those used for manufacturing socks. Suitable knitting machines and bag making methods are shown and described in U.S. Pat. Nos. 3,935,718; 3,974,525; and 4,253,317, the entire of contents of which are incorporated herein by reference. Bags 10 fabricated using circular knitting machines have a single seam 60, which is used to form closed bottom 40 of the bag. Alternatively, the bag can be a knitted or woven fabric bag made in accordance with methods commonly used to fabricate pillow cases. Suitable methods for making the bag of the present invention are therefore also shown and described, for example, in U.S. Pat. Nos. 3,974,531 and 5,184,362, which are directed to pillow cases, the entire contents of which are incorporated herein by reference.

In use, ice chunks 20 are loaded into bag 10 through open top 50. Ice chunks 20 are conventional ice chunks of the type and size commonly found in commercially available bags of ice. For example, ice chunks may be ice cubes sized from 21×21×14 mm to 28×28×32 mm, including 25×25×23 mm. Depending on the size of bag 10, bag 10 may contain between about 5 lbs. to 50 lbs of ice chunks 20, including about 8 lbs. of the ice chunks, about 10 lbs. of the ice chunks, about 20 lbs. of the ice chunks, or about 50 lbs. of the ice chunks. Once bag 10 is fully loaded with ice chunks 20, open top 50 is closed using any means known in the art, for example, using a twist-tie, a staple or a string. Preferably, open top 50 of bag 10 is closed using a thin strip of 100% cotton cloth 70.

An exemplary bag 10 for containing 5 lbs. of the ice chunks may be fabricated from a single ply of 100% cotton knitted fabric using a circular knitting machine, the bag having a diameter of 4 inches and a length of 20 inches tall. When loaded with 5 lbs. of ice chunks 20, the bag expands to exhibit a diameter of 16 inches and has a length of 20 inches. An exemplary bag 10 for containing 10 lbs. of the ice chunks may be fabricated from a single ply of 100% cotton knitted fabric using a circular knitting machine, the bag having a diameter of 4 inches and a length of 24 inches tall. When loaded with 10 lbs. of ice chunks 20, the bag expands to exhibit a diameter of 12 inches and has a length of 24 inches. An exemplary bag 10 for containing 20 lbs. of the ice chunks may be fabricated from a single ply of 100% cotton knitted fabric using a circular knitting machine, the bag having a diameter of 6 inches and a length of 24 inches tall. When loaded with 20 lbs. of ice chunks 20, the bag expands to exhibit a diameter of 15 inches and has a length of 24 inches. An exemplary bag 10 for containing 30 lbs. of the ice chunks may be fabricated from a single ply of 100% cotton knitted fabric using a circular knitting machine, the bag having a diameter of 6 inches and a length of 24 inches tall. When loaded with 30 lbs. of ice chunks 20, the bag expands to exhibit a diameter of 20 inches and has a length of 24 inches. All of the forgoing measurements may vary by about an inch.

After bag 10 containing ice chunks 20 is closed, the bag may be stored indefinitely within a freezer at a temperature of 0° C. or less to ensure that ice chunks 20 do not melt. When it is desired to transport the bag of ice, bag 10 containing ice chunks 20 is loaded into a freezer compartment of a truck and transported to a retail location for purchase by an end-user. The end-user may store the bag in a freezer or cooler and later open bag 10 by removing strip of cloth 70 from bag 10 to provide access to ice chunks 20 stored therein. Ice chunks 20 can then be used to keep cool beverages, food items or recently harvested game animals such as fish, deer or ducks.

As will be apparent to one skilled in the art, various modifications can be made within the scope of the aforesaid description. Such modifications being within the ability of one skilled in the art form a part of the present invention and are embraced by the claims below.

I claim:

1. A method for storing ice chunks comprising:
    forming a seamless, knitted fabric tube, wherein the fabric tube has an open first end and an open second end and is knitted using 100% cotton yarn,
    closing the first end of the tube using a 100% biodegradable thread thereby forming a bag having an open top and a closed bottom,
    placing ice chunks into the bag through the open top,
    using a 100% biodegradable closure material to close the open top and enclose the ice chunks within the bag, and
    placing the bag containing the ice chunks in a freezer.

2. The method of claim 1 including transporting the bag containing ice chunks in a freezer compartment of a motor vehicle.

3. The method of claim 2 including removing the bag containing the ice chunks from the freezer compartment and thereafter placing the bag containing the ice chunks into a second freezer.

4. The method of claim 3 wherein the second freezer is located at a retail store location.

5. The method of claim 1 including using a circular knitting machine to form the fabric tube.

6. The method of claim 1 wherein the bag is biodegradable.

7. A method for storing and transporting ice chunks comprising:
    providing a bag having an open top and a closed bottom, wherein the bag is constructed of a 100% cotton, knitted fabric,
    placing ice chunks into the bag through the open top,
    tying an elongate 100% biodegradable closure material about the open top thereby enclosing the ice chunks within the bag, and
    placing the bag containing the ice chunks in a freezer compartment of a motor vehicle situated at a first location.

8. The method of claim 7 including driving the motor vehicle and the bag containing the ice chunks to a second location.

9. The method of claim 8 including removing the bag containing the ice chunks from the freezer compartment and thereafter placing the bag containing the ice chunks into a second freezer that is located at the second location.

10. A method for storing and transporting ice chunks comprising:
    providing a cotton bag, placing the ice chunks in the cotton bag, enclosing the ice chunks within the cotton bag, and placing the cotton bag containing the ice chunks in a freezer compartment of a motor vehicle situated at a first location.

11. The method of claim 10 including driving the motor vehicle and the cotton bag containing the ice chunks to a second location.

12. The method of claim 11 including removing the cotton bag containing the ice chunks from the freezer compartment and thereafter placing the cotton bag containing the ice chunks into a second freezer that is located at the second location.

13. The method of claim 10 wherein the cotton bag is made of a knitted cotton yarn.

14. The method of claim 10 including forming the cotton bag from a seamless fabric tube.

15. The method of claim 10 wherein the cotton bag includes about 5 lbs. of the ice chunks.

16. The method of claim 10 wherein the cotton bag includes about 8 lbs. of the ice chunks.

17. The method of claim 10 wherein the cotton bag includes about 10 lbs. of the ice chunks.

18. The method of claim 10 wherein the cotton bag includes about 20 lbs. of the ice chunks.

19. The method of claim 10 wherein the cotton bag includes about 50 lbs. of the ice chunks.

20. The method of claim 10 wherein the bag excludes plastic.

\* \* \* \* \*